(12) United States Patent
Seo et al.

(10) Patent No.: US 7,809,775 B2
(45) Date of Patent: Oct. 5, 2010

(54) RECORDING MEDIUM HAVING DATA STRUCTURE FOR MANAGING PLAYBACK CONTROL RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR); Mi Hyun Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 468 days.

(21) Appl. No.: 10/777,637

(22) Filed: Feb. 13, 2004

(65) Prior Publication Data
US 2004/0170377 A1    Sep. 2, 2004

(30) Foreign Application Priority Data
Feb. 27, 2003    (KR) ...................... 10-2003-0012393

(51) Int. Cl.
*G06F 7/00* (2006.01)
(52) U.S. Cl. ...................................... 707/822; 707/828
(58) Field of Classification Search .......... 707/1–104.1, 707/822
See application file for complete search history.

(56) References Cited

U.S. PATENT DOCUMENTS

| | | |
|---|---|---|
| 4,777,357 A | 10/1988 | Harada et al. |
| 5,521,898 A | 5/1996 | Ogasawara |
| 5,559,808 A | 9/1996 | Kostreski et al. |
| 5,583,652 A | 12/1996 | Ware |
| 5,602,956 A | 2/1997 | Suzuki et al. |
| 5,630,006 A | 5/1997 | Hirayama et al. |
| 5,633,839 A | 5/1997 | Alexander et al. |
| 5,651,010 A | 7/1997 | Kostreski et al. |
| 5,691,972 A | 11/1997 | Tsuga et al. |
| 5,729,549 A | 3/1998 | Kostreski et al. |
| 5,732,185 A | 3/1998 | Hirayama et al. |
| 5,734,788 A | 3/1998 | Nonomura et al. |
| 5,742,569 A | 4/1998 | Yamamoto et al. |
| 5,745,643 A | 4/1998 | Mishina |
| 5,747,136 A | 5/1998 | Shono et al. |
| 5,771,334 A | 6/1998 | Yamauchi et al. |

(Continued)

FOREIGN PATENT DOCUMENTS

CN    1134583    10/1996

(Continued)

OTHER PUBLICATIONS

Office Action for corresponding Chinese Application No. 200480009338.8 dated Sep. 5, 2008 and English translation.

(Continued)

*Primary Examiner*—Don Wong
*Assistant Examiner*—Michael Le
(74) *Attorney, Agent, or Firm*—Harness, Dickey & Pierce, P.L.C.

(57) ABSTRACT

The data structure on the recording medium includes a navigation area storing an information file. The information file includes a first playback indicator that identifies a navigation command field for execution at first playback of the recording medium. The identified navigation command field is also stored on the recording medium, and the identified navigation command field includes at least one navigation command.

23 Claims, 9 Drawing Sheets

U.S. PATENT DOCUMENTS

| | | | |
|---|---|---|---|
| 5,784,528 A | 7/1998 | Yamane et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |
| 5,884,004 A | 3/1999 | Sato et al. | |
| 5,907,658 A | 5/1999 | Murase et al. | |
| 5,909,257 A | 6/1999 | Ohishi et al. | |
| 5,913,010 A | 6/1999 | Kaneshige et al. | |
| 5,917,781 A | 6/1999 | Kim | |
| 5,923,869 A | 7/1999 | Kashiwagi et al. | |
| 5,933,410 A | 8/1999 | Nakane et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,953,290 A | 9/1999 | Fukuda et al. | |
| 5,987,126 A | 11/1999 | Okuyama et al. | |
| 5,999,694 A | 12/1999 | Yasuda et al. | |
| 5,999,698 A | 12/1999 | Nakai et al. | |
| 6,009,234 A * | 12/1999 | Taira et al. | 386/95 |
| 6,014,495 A | 1/2000 | Moriyama et al. | |
| 6,016,381 A | 1/2000 | Taira et al. | |
| 6,031,962 A | 2/2000 | Sawabe et al. | |
| 6,035,095 A | 3/2000 | Kaneshige et al. | |
| 6,064,385 A | 5/2000 | Sturgeon et al. | |
| 6,064,796 A | 5/2000 | Nakamura et al. | |
| 6,067,400 A | 5/2000 | Saeki et al. | |
| 6,084,581 A | 7/2000 | Hunt | |
| 6,097,676 A | 8/2000 | Fujinami | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,175,681 B1 | 1/2001 | Kaneshige et al. | |
| 6,181,870 B1 | 1/2001 | Okada et al. | |
| 6,181,872 B1 | 1/2001 | Yamane et al. | |
| 6,195,726 B1 | 2/2001 | Hogan | |
| 6,215,746 B1 | 4/2001 | Ando et al. | |
| 6,219,488 B1 | 4/2001 | Mori et al. | |
| 6,222,805 B1 | 4/2001 | Mori et al. | |
| 6,229,952 B1 | 5/2001 | Nonomura et al. | |
| 6,246,402 B1 | 6/2001 | Setogawa et al. | |
| 6,247,022 B1 | 6/2001 | Yankowski | |
| 6,282,320 B1 | 8/2001 | Hasegawa et al. | |
| 6,285,825 B1 | 9/2001 | Miwa et al. | |
| 6,292,226 B1 | 9/2001 | Yamanaka et al. | |
| 6,308,005 B1 | 10/2001 | Ando et al. | |
| 6,308,006 B1 | 10/2001 | Yamamoto et al. | |
| 6,321,027 B2 | 11/2001 | Honji | |
| 6,336,002 B1 | 1/2002 | Yamauchi et al. | |
| 6,343,062 B1 | 1/2002 | Furukawa et al. | |
| 6,345,147 B1 | 2/2002 | Mimura et al. | |
| 6,351,442 B1 | 2/2002 | Tagawa et al. | |
| 6,353,613 B1 | 3/2002 | Kubota et al. | |
| 6,356,971 B1 | 3/2002 | Katz et al. | |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,381,404 B1 | 4/2002 | deCarmo | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,392,969 B1 | 5/2002 | Heo | |
| 6,393,430 B1 | 5/2002 | Van Ryzin | |
| 6,393,574 B1 | 5/2002 | Kashiwagi et al. | |
| 6,415,101 B1 | 7/2002 | DeCarmo | |
| 6,424,793 B1 | 7/2002 | Setogawa et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,515,101 B1 | 2/2003 | Sheares | |
| 6,532,334 B1 | 3/2003 | Kikuchi et al. | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,570,837 B1 | 5/2003 | Kikuchi et al. | |
| 6,573,819 B1 | 6/2003 | Oshima et al. | |
| 6,580,870 B1 | 6/2003 | Kanazawa et al. | |
| 6,584,277 B2 | 6/2003 | Tsumagari et al. | |
| 6,603,517 B1 | 8/2003 | Shen et al. | |
| 6,615,192 B1 | 9/2003 | Tagawa et al. | |
| 6,618,396 B1 | 9/2003 | Kondo et al. | |
| 6,643,450 B1 | 11/2003 | DeCarmo | |
| 6,647,496 B1 | 11/2003 | Tagawa et al. | |
| 6,654,543 B2 | 11/2003 | Ando et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 | 8/2004 | Tanaka et al. | |
| 6,788,883 B1 | 9/2004 | Park et al. | |
| 6,795,499 B1 | 9/2004 | Kato et al. | |
| 6,798,981 B1 | 9/2004 | Yamauchi et al. | |
| 6,801,713 B1 | 10/2004 | Yagawa et al. | |
| 6,832,293 B1 | 12/2004 | Tagawa et al. | |
| 6,859,421 B2 | 2/2005 | Sawabe et al. | |
| 6,901,078 B2 | 5/2005 | Morris | |
| 6,904,227 B1 | 6/2005 | Yamamoto et al. | |
| 6,912,218 B1 | 6/2005 | Jeon | |
| 6,914,863 B2 | 7/2005 | Ono | |
| 6,965,727 B1 | 11/2005 | Sawabe et al. | |
| 6,985,411 B2 | 1/2006 | Kanegae et al. | |
| 6,999,674 B1 | 2/2006 | Hamada et al. | |
| 7,006,758 B1 | 2/2006 | Yamamoto et al. | |
| 7,024,102 B1 | 4/2006 | Inoshita et al. | |
| 7,050,384 B2 | 5/2006 | Sasaki | |
| 7,065,287 B1 | 6/2006 | Heredia et al. | |
| 7,072,573 B2 | 7/2006 | Okada et al. | |
| 7,106,946 B1 | 9/2006 | Kato | |
| 7,113,694 B2 | 9/2006 | Kim et al. | |
| 7,124,303 B2 | 10/2006 | Candelore et al. | |
| 7,236,687 B2 | 6/2007 | Kato et al. | |
| 7,477,833 B2 | 1/2009 | Kato et al. | |
| 7,565,060 B2 | 7/2009 | Hamada et al. | |
| 2001/0014070 A1 | 8/2001 | Ando et al. | |
| 2001/0026679 A1 | 10/2001 | Koshino et al. | |
| 2001/0030710 A1 | 10/2001 | Werner | |
| 2001/0033517 A1 | 10/2001 | Ando et al. | |
| 2001/0036358 A1 | 11/2001 | Kim et al. | |
| 2001/0038745 A1 | 11/2001 | Sugimoto et al. | |
| 2001/0043790 A1 | 11/2001 | Saeki et al. | |
| 2001/0053280 A1 | 12/2001 | Yamauchi et al. | |
| 2002/0001385 A1 * | 1/2002 | Kawada et al. | 380/201 |
| 2002/0015383 A1 | 2/2002 | Ueno | |
| 2002/0015581 A1 | 2/2002 | Ando et al. | |
| 2002/0018416 A1 | 2/2002 | Heo | |
| 2002/0021761 A1 | 2/2002 | Zhang et al. | |
| 2002/0031336 A1 | 3/2002 | Okada et al. | |
| 2002/0041557 A1 | 4/2002 | Heo | |
| 2002/0046328 A1 | 4/2002 | Okada | |
| 2002/0076201 A1 | 6/2002 | Tsumagari et al. | |
| 2002/0093556 A1 | 7/2002 | Ishizawa et al. | |
| 2002/0093886 A1 * | 7/2002 | Ijichi et al. | 369/30.09 |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0114614 A1 | 8/2002 | Nakatani et al. | |
| 2002/0126994 A1 | 9/2002 | Gunji et al. | |
| 2002/0127002 A1 | 9/2002 | Mori et al. | |
| 2002/0129036 A1 * | 9/2002 | Ho Yuen Lok et al. | 707/104.1 |

| | | | | | | |
|---|---|---|---|---|---|---|
| 2002/0131767 | A1 | 9/2002 | Auwens et al. | CN | 1310445 | 8/2001 |
| 2002/0135607 | A1 | 9/2002 | Kato et al. | CN | 1317200 | 10/2001 |
| 2002/0135608 | A1 | 9/2002 | Hamada et al. | CN | 1320926 | 11/2001 |
| 2002/0145702 | A1 | 10/2002 | Kato et al. | CN | 1321319 | 11/2001 |
| 2002/0150383 | A1 | 10/2002 | Kato et al. | CN | 1346491 | 4/2002 |
| 2002/0159368 | A1 | 10/2002 | Noda et al. | CN | 1364387 | 8/2002 |
| 2002/0177914 | A1 | 11/2002 | Chase | CN | 1383679 | 12/2002 |
| 2002/0180803 | A1 | 12/2002 | Kaplan et al. | CN | 1393872 | 1/2003 |
| 2002/0196365 | A1 | 12/2002 | Cho et al. | CN | 1509572 | 6/2004 |
| 2002/0197059 | A1 | 12/2002 | Cho et al. | CN | 1555058 | 12/2004 |
| 2003/0002194 | A1 | 1/2003 | Andoh | CN | 1571055 | 1/2005 |
| 2003/0007780 | A1* | 1/2003 | Senoh ............ 386/68 | CN | 1606355 | 4/2005 |
| 2003/0026597 | A1 | 2/2003 | Cho et al. | CN | 1606356 | 4/2005 |
| 2003/0035681 | A1 | 2/2003 | Ho | CN | 1606357 | 4/2005 |
| 2003/0046638 | A1 | 3/2003 | Thompson | CN | 1611071 | 4/2005 |
| 2003/0058948 | A1 | 3/2003 | Kelly et al. | EP | 0677842 | 10/1995 |
| 2003/0086568 | A1 | 5/2003 | Kato et al. | EP | 0 724 264 | 7/1996 |
| 2003/0103604 | A1 | 6/2003 | Kato et al. | EP | 0723216 | 7/1996 |
| 2003/0118327 | A1 | 6/2003 | Um et al. | EP | 0737009 | 10/1996 |
| 2003/0123346 | A1 | 7/2003 | Ishii et al. | EP | 0737980 | 10/1996 |
| 2003/0123845 | A1 | 7/2003 | Koda et al. | EP | 0831647 | 3/1998 |
| 2003/0123849 | A1 | 7/2003 | Nallur et al. | EP | 0836183 | 4/1998 |
| 2003/0133509 | A1 | 7/2003 | Yanagihara et al. | EP | 0836189 | 4/1998 |
| 2003/0147322 | A1 | 8/2003 | Ono | EP | 0847198 | 6/1998 |
| 2003/0161615 | A1 | 8/2003 | Tsumagari et al. | EP | 0858073 | 8/1998 |
| 2003/0221055 | A1 | 11/2003 | Okada | EP | 0872839 | 10/1998 |
| 2003/0235403 | A1 | 12/2003 | Seo et al. | EP | 0873022 | 10/1998 |
| 2003/0235404 | A1 | 12/2003 | Seo et al. | EP | 0911825 | 4/1999 |
| 2004/0014136 | A1 | 1/2004 | Ishii et al. | EP | 0917149 | 5/1999 |
| 2004/0019396 | A1 | 1/2004 | McMahon et al. | EP | 0917355 | 5/1999 |
| 2004/0047588 | A1 | 3/2004 | Okada et al. | EP | 0918438 | 5/1999 |
| 2004/0047591 | A1 | 3/2004 | Seo et al. | EP | 0920203 | 6/1999 |
| 2004/0047923 | A1 | 3/2004 | Turpen et al. | EP | 0 929 072 | 7/1999 |
| 2004/0076402 | A1 | 4/2004 | Jung et al. | EP | 0940983 | 9/1999 |
| 2004/0086261 | A1 | 5/2004 | Hanes | EP | 1024494 | 8/2000 |
| 2004/0114908 | A1 | 6/2004 | Ito | EP | 1050880 | 11/2000 |
| 2004/0120694 | A1 | 6/2004 | Hamada et al. | EP | 1081885 | 3/2001 |
| 2004/0156621 | A1 | 8/2004 | Seo et al. | EP | 1103974 | 5/2001 |
| 2004/0179819 | A1 | 9/2004 | Cho et al. | EP | 1126454 | 8/2001 |
| 2004/0179820 | A1 | 9/2004 | Kashiwagi et al. | EP | 1041565 | 9/2001 |
| 2004/0179823 | A1 | 9/2004 | Jung et al. | EP | 1148503 | 10/2001 |
| 2004/0179827 | A1 | 9/2004 | Cho et al. | EP | 1041569 | 1/2002 |
| 2004/0208135 | A1 | 10/2004 | Nakamura et al. | EP | 1198132 | 4/2002 |
| 2004/0213105 | A1 | 10/2004 | Seo et al. | EP | 1198133 | 4/2002 |
| 2004/0220791 | A1 | 11/2004 | Lamkin et al. | EP | 1 205 933 A2 | 5/2002 |
| 2004/0247290 | A1 | 12/2004 | Seo et al. | EP | 1202568 | 5/2002 |
| 2004/0252975 | A1 | 12/2004 | Cho et al. | EP | 1 271 526 | 1/2003 |
| 2005/0019007 | A1* | 1/2005 | Kato et al. ............ 386/69 | EP | 1280348 | 1/2003 |
| 2005/0025459 | A1 | 2/2005 | Kato et al. | EP | 1286544 | 2/2003 |
| 2005/0036763 | A1 | 2/2005 | Kato et al. | EP | 1391119 | 2/2004 |
| 2005/0063671 | A1 | 3/2005 | Jung et al. | EP | 1398965 | 3/2004 |
| 2005/0063672 | A1 | 3/2005 | Jung et al. | EP | 1469677 | 10/2004 |
| 2005/0232111 | A1 | 10/2005 | Sawabe et al. | EP | 1516329 | 3/2005 |
| 2006/0013564 | A1 | 1/2006 | Hamada et al. | EP | 1 521 463 | 4/2005 |
| 2006/0110132 | A1 | 5/2006 | Takakuwa et al. | EP | 0949622 | 12/2006 |
| 2006/0222340 | A1 | 10/2006 | Yamauchi et al. | JP | 64-003781 | 1/1989 |
| 2007/0047923 | A1 | 3/2007 | Eklund et al. | JP | 01-116819 | 5/1989 |
| 2008/0019672 | A1 | 1/2008 | Hamasaka et al. | JP | 3-199243 | 8/1991 |
| 2008/0253742 | A1 | 10/2008 | Hamada et al. | JP | 08-088832 | 4/1996 |
| 2009/0180757 | A1 | 7/2009 | De Haan | JP | 08-235833 | 9/1996 |
| | | | | JP | 8-273304 | 10/1996 |
| | | | | JP | 09-023403 | 1/1997 |
| | | FOREIGN PATENT DOCUMENTS | | JP | 09-135421 | 5/1997 |
| CN | | 1163673 | 10/1997 | JP | 09-251759 | 9/1997 |
| CN | | 1205793 | 1/1999 | JP | 10-032780 | 2/1998 |
| CN | | 1212427 | 3/1999 | JP | 10-040667 | 2/1998 |
| CN | | 1220458 | 6/1999 | JP | 10-051737 | 2/1998 |
| CN | | 1237852 | 12/1999 | JP | 10-269698 | 10/1998 |
| CN | | 1239574 | 12/1999 | JP | 10-271449 | 10/1998 |
| CN | | 1251461 | 4/2000 | JP | 10-299698 | 11/1998 |
| CN | | 1251680 | 4/2000 | JP | 11-041563 | 2/1999 |
| CN | | 1263345 | 8/2000 | JP | 11-069308 | 3/1999 |
| CN | | 1272209 | 11/2000 | JP | 11-069309 | 3/1999 |

| | | | | | |
|---|---|---|---|---|---|
| JP | 11-096653 | 4/1999 | JP | 2005-513936 | 5/2005 |
| JP | 11-103444 | 4/1999 | JP | 2005-251392 | 9/2005 |
| JP | 11-120474 | 4/1999 | KR | 1996-0038743 | 11/1996 |
| JP | 11-134812 | 5/1999 | KR | 1996-0038744 | 11/1996 |
| JP | 11-161663 | 6/1999 | KR | 1996-0038901 | 11/1996 |
| JP | 11-185463 | 7/1999 | KR | 1996-0038905 | 11/1996 |
| JP | 11-213522 | 8/1999 | KR | 1999-0022858 | 10/1997 |
| JP | 11-213627 | 8/1999 | KR | 0178246 | 4/1999 |
| JP | 11-259976 | 9/1999 | KR | 1999-0079482 | 11/1999 |
| JP | 11-259985 | 9/1999 | KR | 2000-0031861 | 6/2000 |
| JP | 11-296997 | 10/1999 | KR | 2000-0053633 | 8/2000 |
| JP | 11-346341 | 12/1999 | KR | 2000-0055028 | 9/2000 |
| JP | 2000-001130 | 1/2000 | KR | 2000-0056179 | 9/2000 |
| JP | 2000-021130 | 1/2000 | KR | 2000-0065876 | 11/2000 |
| JP | 2000-030414 | 1/2000 | KR | 2001-0022702 | 3/2001 |
| JP | 2000-041066 | 2/2000 | KR | 10-0294884 | 4/2001 |
| JP | 2000-067522 | 3/2000 | KR | 2001-0028735 | 4/2001 |
| JP | 2000-069437 | 3/2000 | KR | 2001-0051898 | 6/2001 |
| JP | 2002-083486 | 3/2000 | KR | 2001-0098007 | 11/2001 |
| JP | 2000-113602 | 4/2000 | KR | 2001-0098101 | 11/2001 |
| JP | 2000-149405 | 5/2000 | KR | 2001-0107578 | 12/2001 |
| JP | 2000-149514 | 5/2000 | KR | 2002-0006273 | 1/2002 |
| JP | 2000-195235 | 7/2000 | KR | 2002-0006674 | 1/2002 |
| JP | 2000-222822 | 8/2000 | KR | 2002-0020919 | 3/2002 |
| JP | 2000-235779 | 8/2000 | KR | 2002-0094018 | 12/2002 |
| JP | 2000-235780 A | 8/2000 | KR | 2002-0097454 | 12/2002 |
| JP | 2000-236496 | 8/2000 | KR | 2002-0097455 | 12/2002 |
| JP | 2000-293938 | 10/2000 | KR | 2004-0000290 | 1/2004 |
| JP | 2000-299836 | 10/2000 | KR | 2004-0030992 | 4/2004 |
| JP | 2000-322827 | 11/2000 | KR | 2004-0030994 | 4/2004 |
| JP | 2000-322875 | 11/2000 | KR | 2004-0030995 | 4/2004 |
| JP | 2000-331466 | 11/2000 | KR | 2004-0041581 | 5/2004 |
| JP | 2000-348442 | 12/2000 | RU | 2229174 | 5/2004 |
| JP | 2000-348467 | 12/2000 | TW | 391548 | 5/2000 |
| JP | 2001-024985 | 1/2001 | WO | WO 97/13361 | 4/1997 |
| JP | 2001-067802 | 3/2001 | WO | WO 97/13363 | 4/1997 |
| JP | 2001-111929 | 4/2001 | WO | WO 97/13364 | 4/1997 |
| JP | 2001-111960 | 4/2001 | WO | WO 97/13365 | 4/1997 |
| JP | 2001-157145 | 6/2001 | WO | WO 97/13366 | 4/1997 |
| JP | 2001-157208 | 6/2001 | WO | WO 97/14151 | 4/1997 |
| JP | 2001-169246 | 6/2001 | WO | WO 97/15924 | 5/1997 |
| JP | 2001-195809 | 7/2001 | WO | WO 97/37491 | 10/1997 |
| JP | 2001-297535 | 10/2001 | WO | WO 97/38527 | 10/1997 |
| JP | 2001-332006 | 11/2001 | WO | WO 97/39451 | 10/1997 |
| JP | 2001-359072 | 12/2001 | WO | WO 98/00952 | 1/1998 |
| JP | 2002-025231 A | 1/2002 | WO | WO 98/09290 | 3/1998 |
| JP | 2002-056651 | 2/2002 | WO | WO 99/08281 | 2/1999 |
| JP | 2002-082838 | 3/2002 | WO | WO 99/38169 | 7/1999 |
| JP | 2002-083486 | 3/2002 | WO | WO 00/02195 | 1/2000 |
| JP | 2002-084488 | 3/2002 | WO | WO 00/42515 | 7/2000 |
| JP | 2002-112179 | 4/2002 | WO | WO 00/46803 | 8/2000 |
| JP | 2002-112201 | 4/2002 | WO | WO 00/60597 | 10/2000 |
| JP | 2002-150685 | 5/2002 | WO | WO 00/62295 | 10/2000 |
| JP | 2002-157838 | 5/2002 | WO | WO 01/35648 | 5/2001 |
| JP | 2002-157859 | 5/2002 | WO | WO 01/35650 | 5/2001 |
| JP | 2002-158972 | 5/2002 | WO | WO 01/52554 | 7/2001 |
| JP | 2002-158974 | 5/2002 | WO | WO 01/82604 | 11/2001 |
| JP | 2002-216460 | 8/2002 | WO | WO 01/82606 | 11/2001 |
| JP | 2002-222581 | 8/2002 | WO | WO 01/82608 | 11/2001 |
| JP | 2002-288942 | 10/2002 | WO | WO 01/82609 | 11/2001 |
| JP | 2002-352515 | 12/2002 | WO | WO 01/82610 | 11/2001 |
| JP | 2003-6979 | 1/2003 | WO | WO 01/82611 | 11/2001 |
| JP | 3392838 | 1/2003 | WO | WO 02/075739 A1 | 9/2002 |
| JP | 3392849 | 1/2003 | WO | WO 02/079902 | 10/2002 |
| JP | 2003-059241 | 2/2003 | WO | WO 02/080541 | 10/2002 |
| JP | 2003-068057 | 3/2003 | WO | WO 03/047261 | 6/2003 |
| JP | 2003-087744 | 3/2003 | WO | WO 03/058957 | 7/2003 |
| JP | 2003-116100 | 4/2003 | WO | WO 04/001728 | 12/2003 |
| JP | 2003-199047 | 7/2003 | WO | WO 04/001749 | 12/2003 |
| JP | 2003-520514 | 7/2003 | WO | WO 04/001750 | 12/2003 |
| JP | 2003-233952 | 8/2003 | WO | WO 04/001752 | 12/2003 |
| JP | 3379961 | 12/2003 | WO | WO 04/001753 | 12/2003 |
| JP | 2004-127397 | 4/2004 | WO | WO 04/001754 | 12/2003 |

| WO | WO 2004/032142 | 4/2004 |
| WO | WO 2004/047100 | 6/2004 |
| WO | WO 2004/075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |
| WO | WO 2004/088661 | 10/2004 |
| WO | WO 2004/098183 | 11/2004 |

OTHER PUBLICATIONS

Office Action for corresponding Japanese Application No. 2004-515203 dated Nov. 18, 2008.
Russian Decision on Grant dated Jan. 27, 2009.
Australian Office Action dated Oct. 27, 2008.
Japanese Office Action corresponding to counterpart Japanese Application No. 2004-515201 dated Mar. 3, 2009.
Japanese Office Action dated Sep. 16, 2008 corresponding to Japanese Application No. 2004-553264.
Australian Office Action dated Sep. 11, 2008 corresponding to Australian Application No. 2003240036.
Australian Office Action dated Sep. 17, 2008 corresponding to Australian Application No. 2003228113.
Mimura, H: "DVD-Video format" COMPCON '97. Proceedings, IEEE San Jose, CA, USA Feb. 23-26, 1997, Los Alamito, CA, USA IEEE Comput. Soc., US, Feb. 23, 1007 (Feb. 23, 1997), pp. 291-294, XP010219552, ISBN: 978-0-8186-7804-2.
Yamada, H: "DVD overview removable storage media" COMPCON '97. Proceedings, IEEE San Jose, CA, USA, Feb. 23-26, 1997, Los Alamitos, CA, USA, IEEE Comput. Soc., USA, Feb. 23, 1997, pp. 287-290, XP010219551, ISBN: 978-0-8186-7804-2.
European Office Action dated Jun. 16, 2009.
European Office Action dated Jun. 19, 2009.
Japanese Office Action dated Jul. 28, 2009.
European Search Report dated Aug. 12, 2009.
United States Notice of Allowance dated May 8, 2009.
United States Office Action dated Sep. 15, 2009.
United States Office Action dated Sep. 14, 2009.
Search Report for corresponding European Application No. 04714511.5 dated Nov. 12, 2009.
Office Action dated Feb. 3, 2010 for counterpart U.S. Appl. No. 10/715,462.
Office Action with English translation dated Feb. 5, 2010 for counterpart Japanese Patent Application No. 2008-314833.
Office Action date May 27, 2010 for counterpart Korean Patent Application No. 10-2005-7015057.

* cited by examiner

RECORDING MEDIUM HAVING DATA STRUCTURE FOR MANAGING PLAYBACK CONTROL RECORDED THEREON AND RECORDING AND REPRODUCING METHODS AND APPARATUSES

FOREIGN PRIORITY

The present invention claims priority under 35 U.S.C. 119 on Korean Application No. 10-2003-012393 filed Feb. 27, 2003; the contents of which are incorporated by reference in their entirety.

BACKGROUND OF THE INVENTION

1. Field of the Invention

The present invention relates to a recording medium having a data structure for managing reproduction of data streams recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clip files. The STREAM directory may also include a special type of clip referred to as a bridge-clip A/V stream file. A bridge-clip file is used for making seamless connection between two or more presentation intervals selected in the clip files, and generally have a small data size compared to clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID (s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). Expressed another way, the playlist file identifies playitems, each playitem points to a clip file or portion thereof and identifies the clip information file associated with the clip file. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing multiple component data recorded on the high-density read-only optical disk such as a BD-ROM is not yet available.

SUMMARY OF THE INVENTION

The recording medium according to the present invention includes a data structure for managing playback control of the recording medium.

In one exemplary embodiment, a navigation area stores an information file including a first playback indicator. The first playback indicator identifies a navigation command field for execution at first playback of the recording medium. For example, first playback is when the recording medium is first read. The navigation area further stores the identified navigation command field, and the identified navigation command field includes at least one navigation command.

The present invention further provides apparatuses and methods for recording and reproducing the data structure according to the present invention, and recording and reproducing data streams according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

A high-density recording medium such as a high density optical disk, for example, a Blu-Ray ROM (BD-ROM), BD-RE, etc. in accordance with the invention has a file or data structure for managing reproduction of, for example, video and audio data. Some aspects of the data structure according to the present invention are the same as the well-known BD-RE standard, as such these aspects will not be repeated. Instead, only the different aspects of the data structures according to the embodiments of the present invention will be described in detail for the sake of brevity.

Programs, video and audio data are typically organized as individual titles; for example, different movies represented by video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Figure 1:
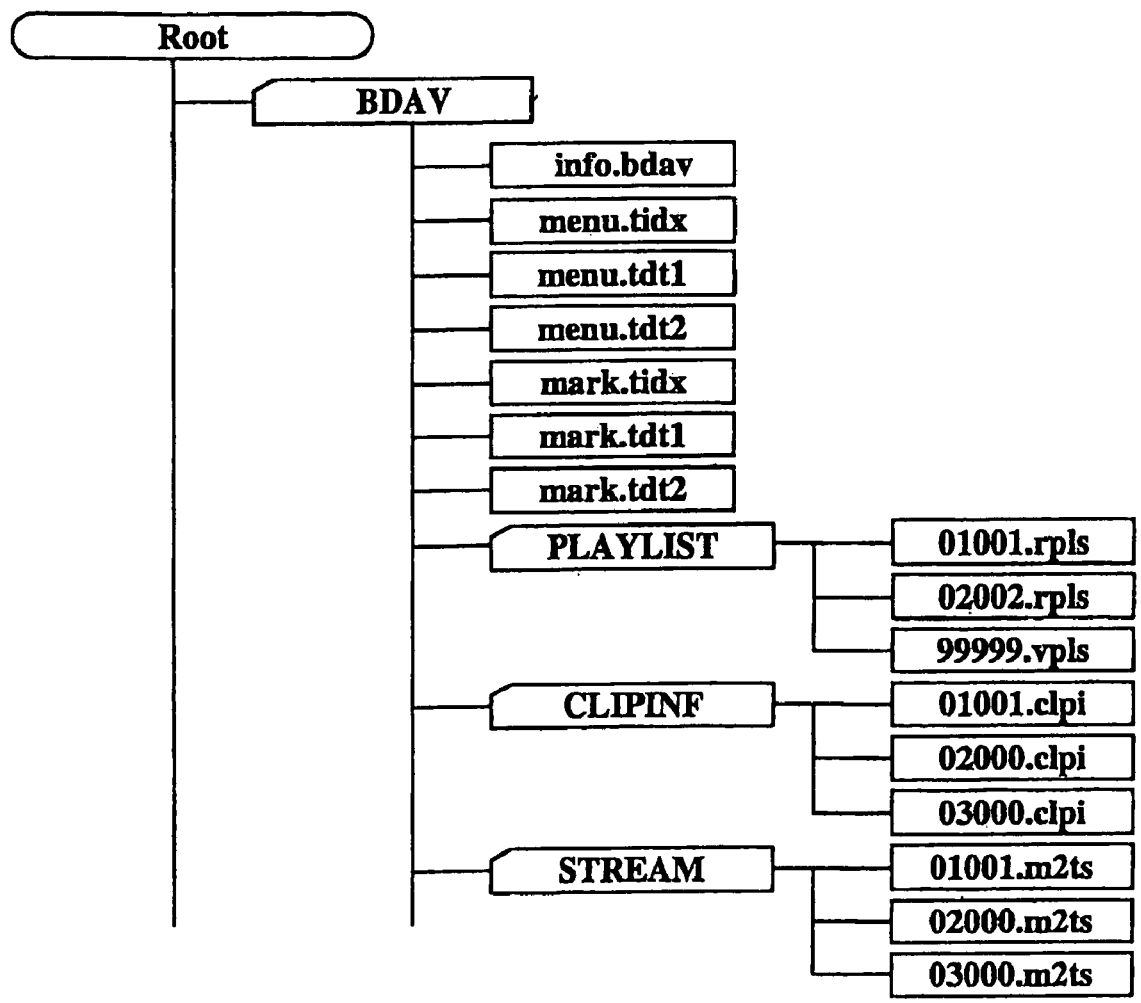
FIG. 1 illustrates the prior art file or data structure of a rewritable optical disk according to the Blu-ray Disc Rewritable (BD-RE) standard.
Figure 2:
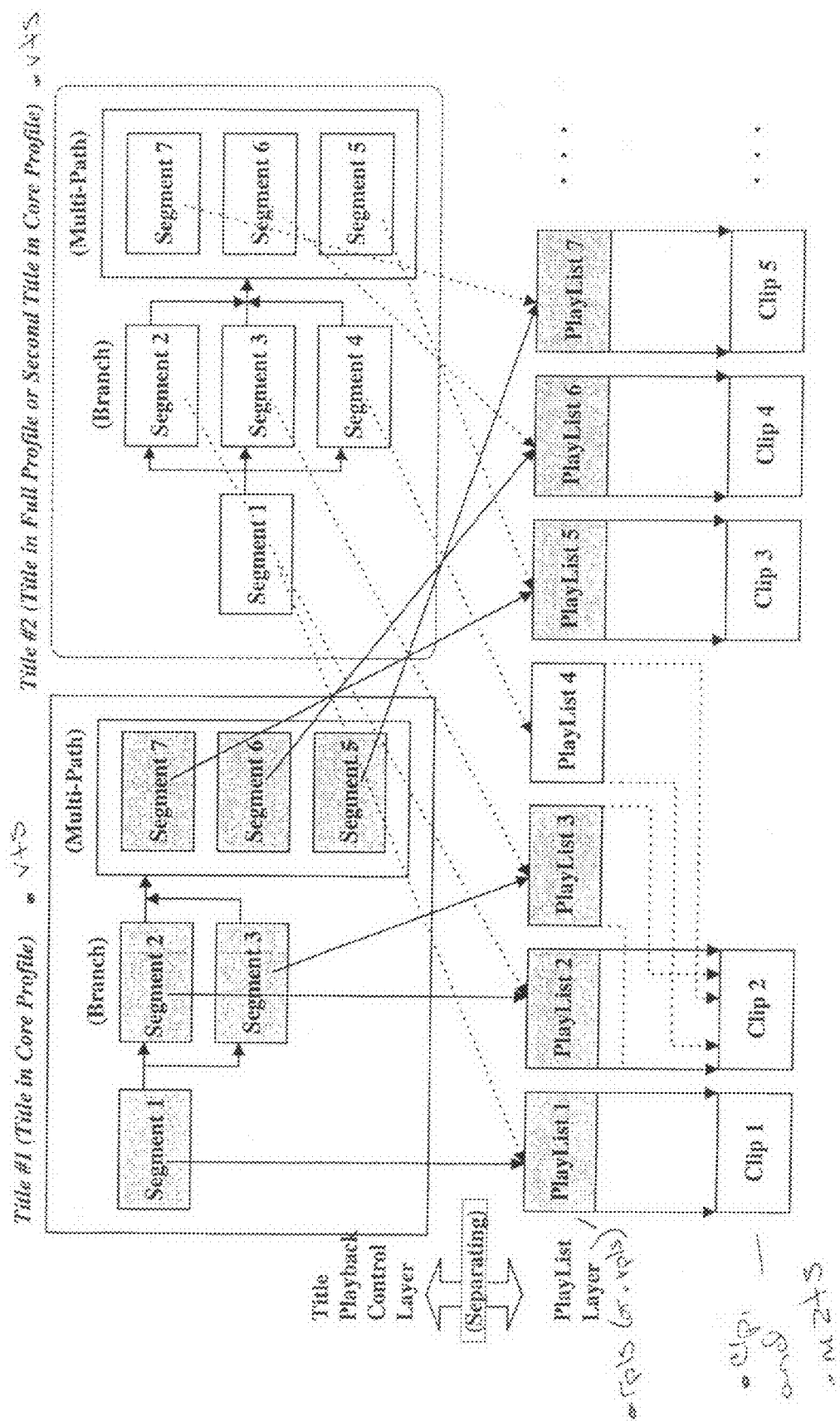
FIG. 2 illustrates an embodiment of a data structure and method for managing data streams of a high-density recording medium such as a BD-ROM.

FIG. 2 illustrates an embodiment of a data structure and method for managing data streams of a high-density recording medium such as a BD-ROM. As shown, A/V streams recorded on a BD-ROM are stored and managed as clip files, and playlists associated with the clip files are managed for playback control of the clip files. In addition, segments associated with the playlists are newly defined and, for example, multiple titles in which some of the segments are arranged in different sequences are managed.

The playlists referencing the recorded A/V stream clip files are managed in a playlist layer, whereas the playback of playlists such as for multiple titles are managed in a title playback control layer. As a result, the clip files, playlists and multi-titles are managed separately.

In FIG. 2, a first title Title #1 contains Segment 1 through Segment 7 linked to each other in a specific sequence, wherein Segments 2 and 3 constitute a branch structure and Segments 5, 6, and 7 constitute a multi-path structure. A segment is a navigation command field providing at least one navigation command associated with reproduction of the recording medium. For example, the Segment 1 provides navigation commands for playback of PlayList 1. The Segment 2 and Segment 3 provide navigation commands for playback of PlayList 2 and PlayList 3, respectively. While PlayList 2 references and controls playback of the entire A/V stream of Clip 2, PlayList 3 references and controls playback of only a part of the A/V stream of Clip 2.

Similarly, the Segments 5, 6, and 7 provide navigation commands for playback of PlayLists 5, 6, and 7, respectively. As discussed above, Segments 5, 6 and 7 provide navigation information for different reproduction path. For example, the A/V stream referenced by PlayList 5 may be marked as valid in Korea, the A/V stream referenced by PlayList 6 may be marked as valid in the USA, and the A/V stream referenced by PlayList 7 may be marked as valid in Japan.

Title #2 in FIG. 2 may be recorded and managed as either a complementary second title or a distinct title. In Title #2, Segments 2, 3, and 4 constitute a branch structure and Segments 5, 6, and 7 constitute a multi-path structure. Title #2 may contain playlists that are associated with Title #1 or may only contain new playlists.

Figure 3:
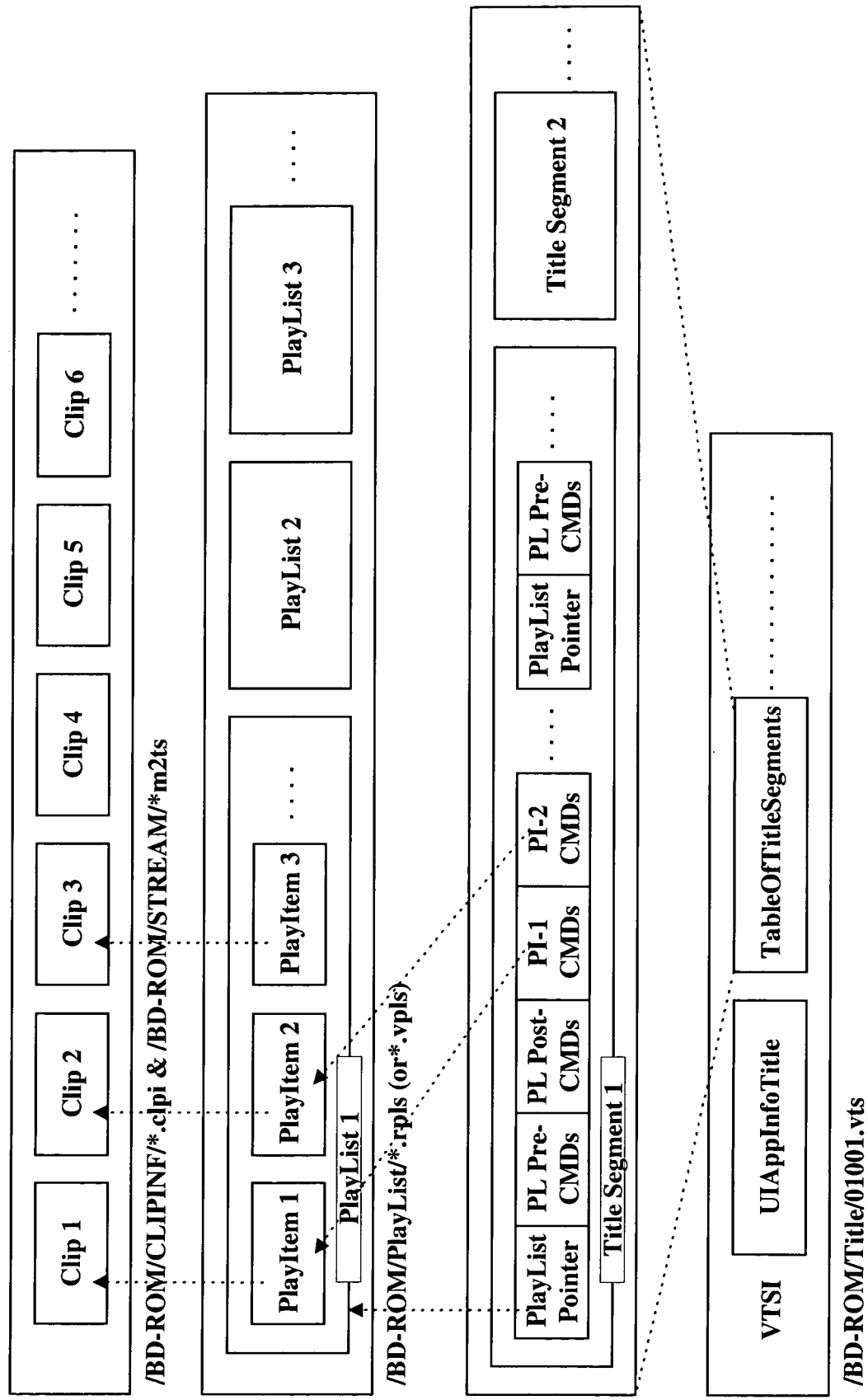
FIG. 3 illustrates an example of a data structure including a TITLE directory.

The playback sequence and playback control information for the segments contained in Title #2 may be recorded by a program such as 'Java Scriptor', whereas the playback sequence and playback control information for the segments contained in Title #1 may be recorded as commands. Titles exclusively for playing main A/V data are classified as core-profile titles and titles having additional contents such as director's commentary are classified as full-profile titles Such titles may be stored in a TITLE directory belonging to the BD-ROM file structure. FIG. 3 illustrates an example of a data structure including a TITLE directory. In FIG. 3, for example, the root directory contains a BD-ROM directory and the BD-ROM directory contains a TITLE directory in which a title file named '01001.vts' is placed.

The navigation information contained in the title file '01001.vts', for example, the VTSI may include user interface application information (UIApplnfTitle), a title segment table (TableOfTitleSegment), etc. Each title segment, such as Title Segment 1 contained in TableOfTitleSegment may include a playlist pointer (PlayList Pointer), playlist pre-commands (PL Pre-CMDs), playlist post-commands (PL Post-CMDs), and playitem commands (PI-CMDs) that correspond to the playitems contained in the corresponding playlist.

A PlayList Pointer is special information for linking the title to a playlist among a plurality of playlists placed in the PLAYLIST directory and the name or number of a playlist is stored in a PlayList Pointer. In FIG. 3, the PlayList Pointer for Title Segment 1 points to PlayList 1.

The PL Pre-CMDs contain initialization information for playback of the A/V data corresponding to the playlist. The PL Post-CMDs contain information used when terminating the playback of the playlist.

A title segment may be associated with a single playlist or more than one playlists. In the latter case, a title segment includes more than one playlist pointer.

The playitems contained in the playlists are associated with the clip information files placed in the CLIPINF directory. Each of the clip information files is in turn associated with a clip file placed in the STREAM directory.

Figure 4:
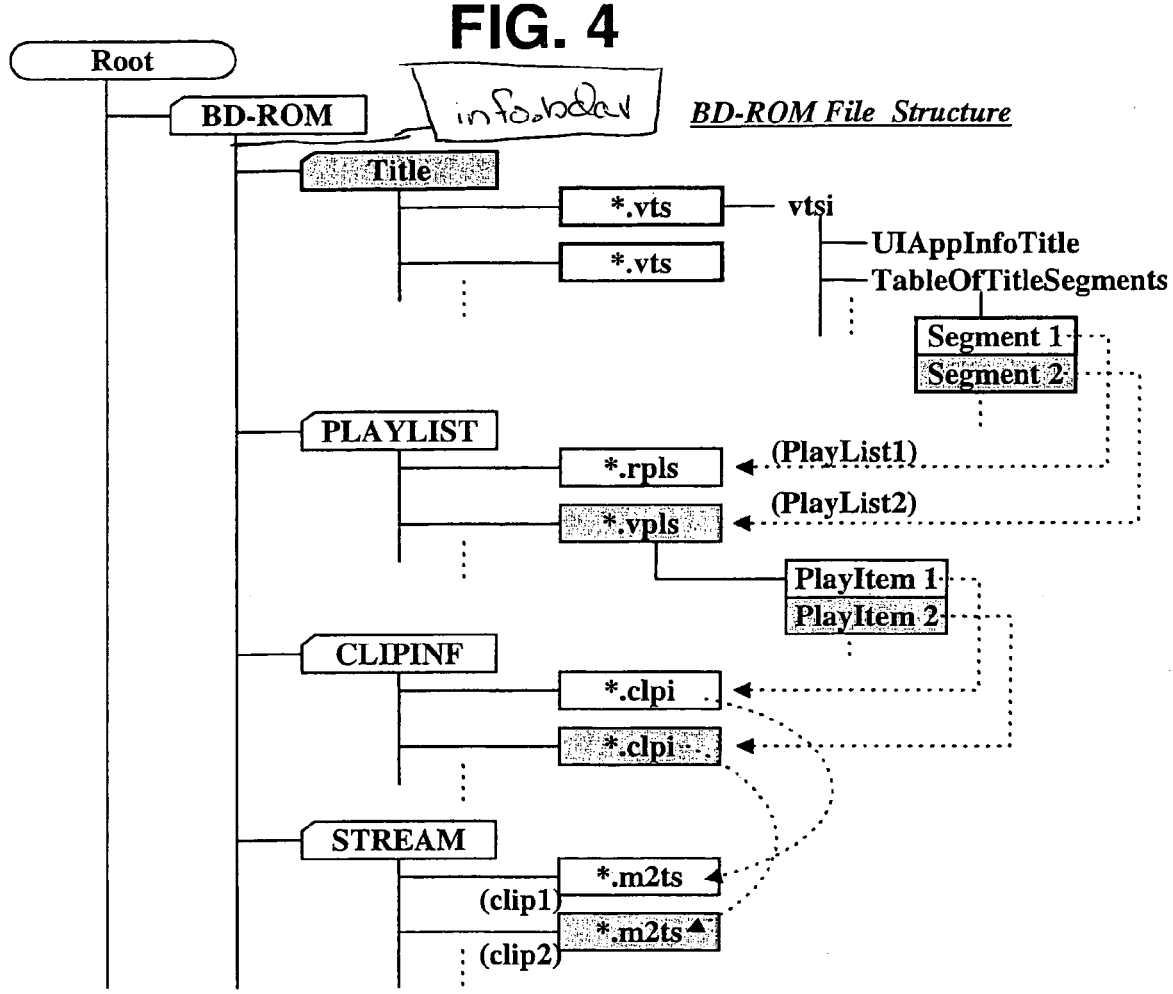
FIG. 4 illustrates another embodiment of a data structure according to the present invention.

FIG. 4 illustrates an embodiment of a data structure according to the present invention. As shown, a root directory includes a BD-ROM directory. The BD-ROM directory includes the TITLE directory containing title files (*.vts) as well as PLAYLIST, CLIPINF, STREAM directories.

The VTSI included in a title file includes UIAppInfoTitle and TableOfTitleSegment explained above with reference to FIG. 3. The TableOfTitleSegment contains a list of title segments. Each of the title segments is associated with one or more playlist files. In FIG. 4, Segment 2 is associated with PlayList 2 and the playitems contained in PlayList 2 have corresponding clip information files stored in the CLIPINF directory. The clip information files are associated with clip files (*.m2ts) placed in the STREAM directory.

Figure 5:
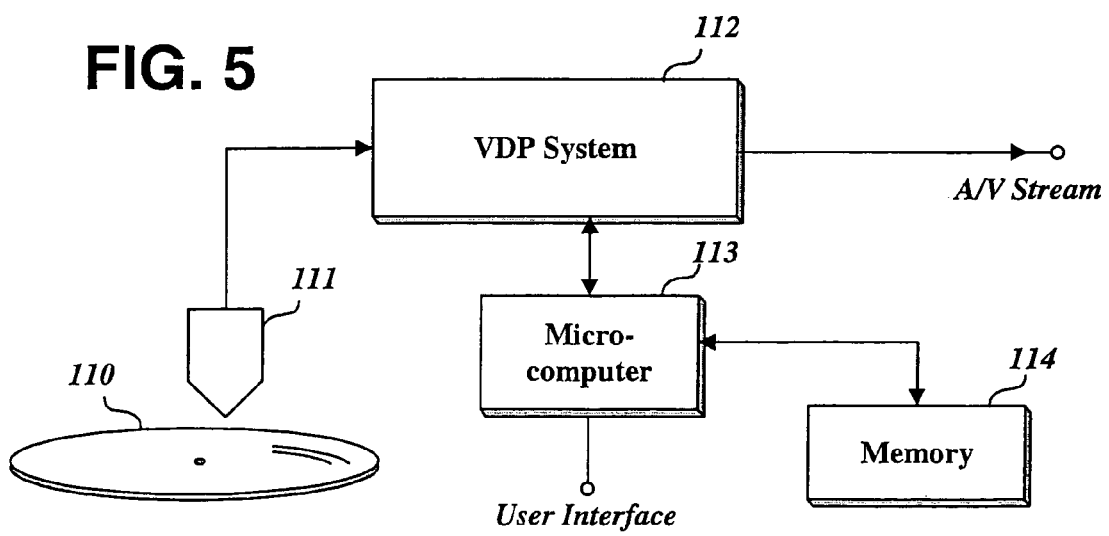
FIG. 5 illustrates a schematic diagram of a partial structure of an optical disc reproducing apparatus where the present invention is applied.

FIG. 5 illustrates a schematic diagram of a partial structure of an optical disc apparatus where the present invention may be applied. As shown, the optical disc apparatus includes an optical pickup 111 for reproducing data from the an optical disk. A VDP (Video Disc Play) system 112 controls the reproduction operation of the optical pickup 111 and dembdulates the data reproduced by the optical pickup 111. The VDP system 112 produces an AV stream, which may also be fed to a D/A converter 113 to generate an analog version of the AV stream.

The VDP system 12 controls the optical pickup 111 and demodulates the reproduced data based on user input received from a user interface and the navigation and management information recorded on the optical disk in accordance with the present invention. During reproduction, the reproduced navigation/management information may be stored in a memory 114. The VDP system 112 plays a title by consulting the segments included in the title file, thereby playing A/V streams in various sequences. A playlist is accessed by the corresponding playlist pointer contained in the title segment.

After performing initialization using PL Pre-CMDs contained in the title segment, the optical disk apparatus plays the A/V stream associated with each of the PI-CMDs. After playing the A/V stream, the optical disk apparatus executes subsequent steps such as selection of a title segment in a branch based on the PL-Post CMDs of the playlist.

On the other hand, the TITLE directory may contain both core-profile title files having only main A/V data and full-profile title files having additional contents as well as main A/V data. Alternatively, core-profile title files and full-profile title files may be stored in two separate directories. For example, full-title files may be stored in a FULLTITLE directory.

The BD-ROM directory may contain a directory named CONTENTS in which various contents such as director's commentary constituting a full-profile title file are stored. Navigation information for the contents files is recorded in the full-profile title file; therefore various contents can be played together with the main A/V data.

Next, several embodiments of a data structure for controlling playback of a high-density recording medium such as BD-ROM when the high-density recording medium is first read will be discussed.

Figure 6:
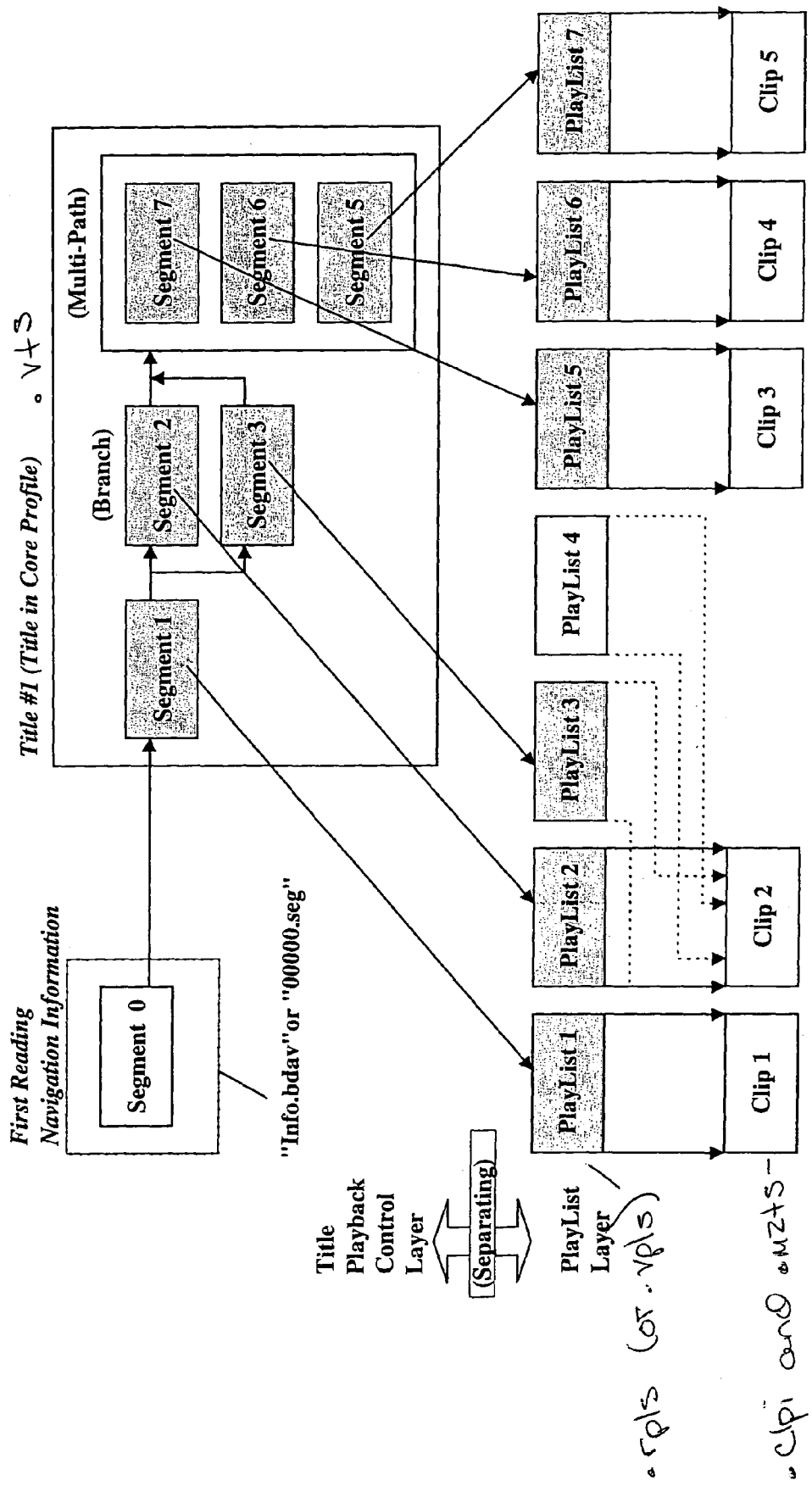
FIGS. 6-9 each illustrate an example embodiment of a data structure for controlling playback of a high-density recording medium such as BD-ROM when the high-density recording medium is first read.

FIG. 6 illustrates a first embodiment of such a data structure. As shown, a specific segment, Segment 0, for accessing Segment 1 of a title (TITLE #1) is recorded in an information file that is accessed when playback initialization is executed. Or, as shown, the specific information may be recorded in a segment file not associated with data streams. For example, Segment 0 may be recorded either in an 'Info.bdav' file placed in the BD-ROM directory or in '00000.seg' file.

System initialization commands required to play the title are placed in the Segment 0. A reproducing apparatus such as in FIG. 5 locates the starting segment of the title by consulting Segment 0 recorded in the 'Info.bdav' file or file '00000.seg', and executes system initialization using the system initialization commands contained in Segment 0 before playing A/V data streams of the title; namely, before executing the navigation command in Segment 1 to reproduce PlayList 1.

Figure 7:
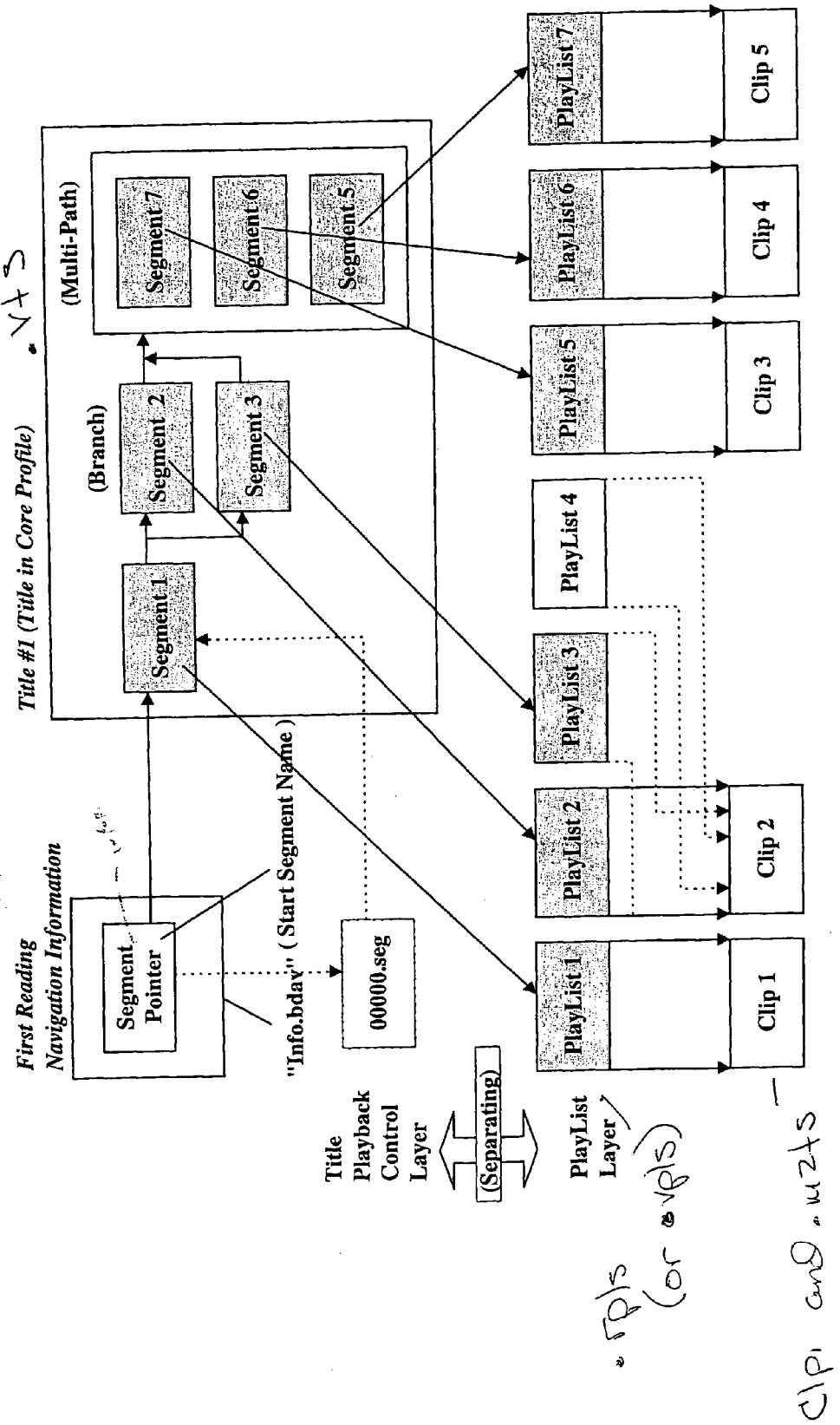

In a second embodiment illustrated in FIG. 7, only a segment pointer for accessing Segment 1 of the title is recorded in 'Info.bdav'. The name of Segment 1 may be stored in the segment pointer.

The Segment 1 of the title, which is accessed by the segment pointer, may contain system initialization commands, and includes a navigation command to reproduce PlayList 1. The reproducing apparatus such as in FIG. 5 locates the Segment 1 of the title using the segment pointer recorded in 'Info.bdav' file and executes system initialization using the system initialization commands contained in 'Info.bdav' file or Segment 1 before playing A/V data streams of the title; namely, before reproducing PlayList 1 as commanded by Segment 1.

The segment pointer recorded in the 'Info.bdav' file may access a specific segment file not associated with data streams, for example, '00000.seg' file. In this case, a '00000.seg' file includes a specific segment, Segment 0, for accessing Segment 1 of the title and the specific segment, Segment 0, contains system initialization commands.

The reproducing apparatus such as in FIG. 5 accesses the '00000.seg' file using the segment pointer recorded in 'Info.bdav' file, and then accesses Segment 1 of the title by consulting Segment 0 recorded in the '00000.seg' file. Also, the reproducing apparatus executes system initialization using the system initialization commands contained in the Segment 0 before playing A/V data streams of the title.

Figure 8:
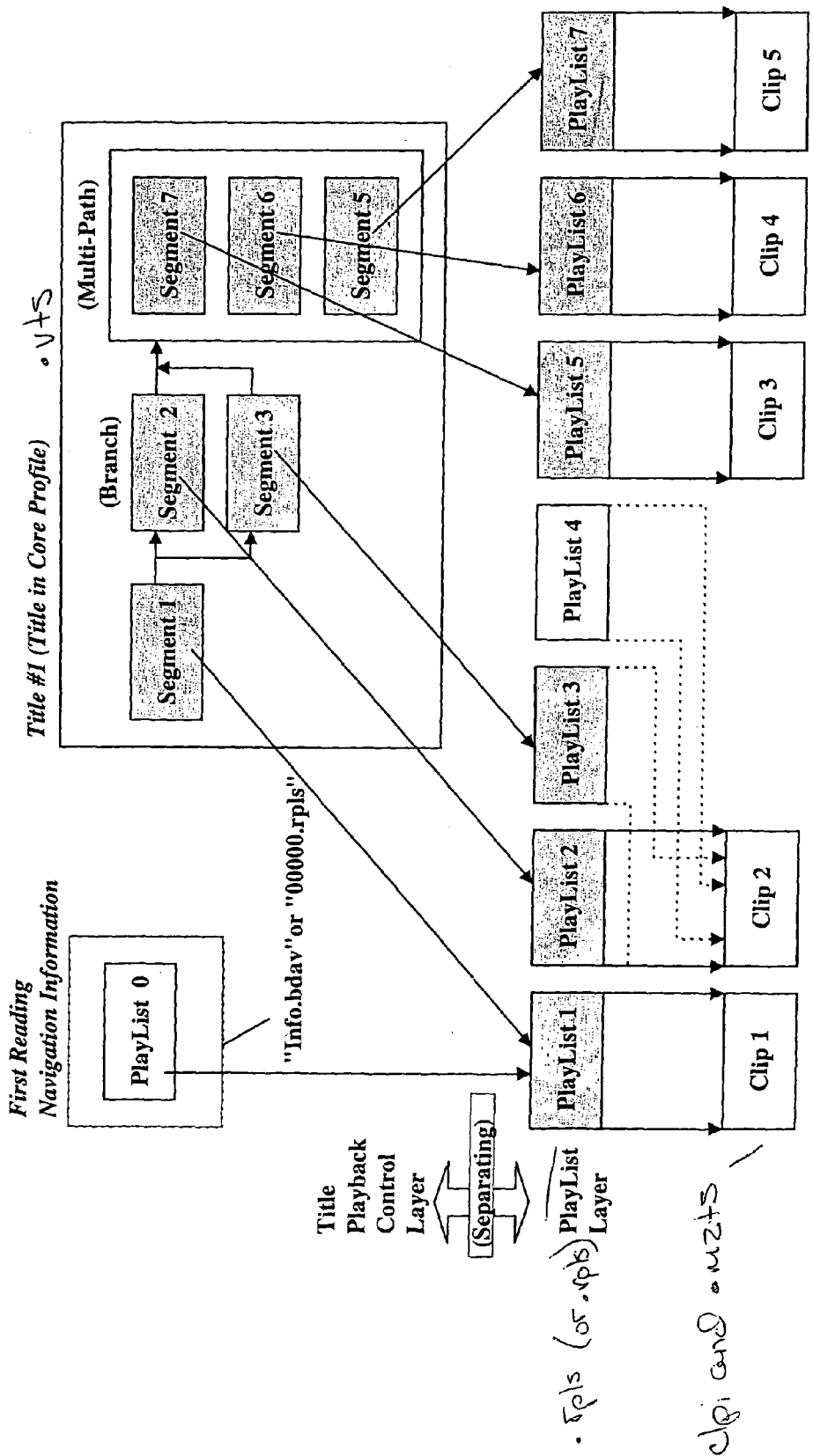

In a third embodiment illustrated in FIG. 8, a specific playlist, PlayList 0, for accessing PlayList 1 associated with Segment 1 of the title is recorded in an information file that is accessed when playback initialization is executed. PlayList 0 may be recorded in the 'Info.bdav' file that belongs to the BD-ROM directory or in the PLAYLIST directory as file '00000.rpls'.

System initialization commands required to play the title are placed in the PlayList 0. The reproducing apparatus such as in FIG. 5 locates PlayList 1 of the title by consulting PlayList 0 recorded in 'Info.bdav' file or file '00000.rpls' and executes system initialization using the system initialization commands contained in PlayList 0 before playing A/V data streams of the title.

Figure 9:
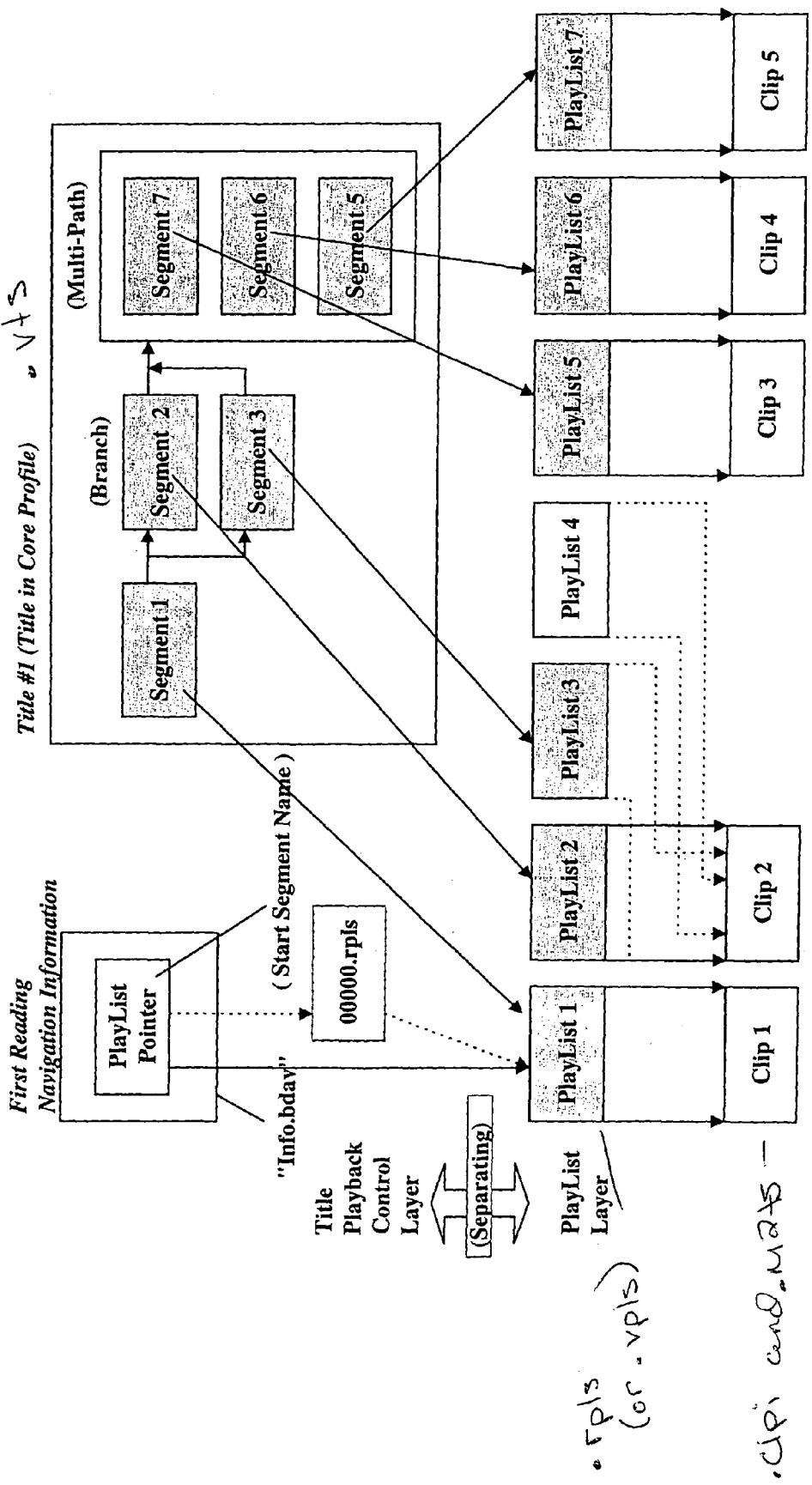

In a fourth embodiment illustrated in FIG. 9, only a playlist pointer for accessing PlayList 1 associated with Segment 1 of the title is recorded in the 'Info.bdav' file. The name of PlayList 1 may be stored in the playlist pointer.

The PlayList 1 of the title, which is accessed by the playlist pointer, contains system initialization commands. The reproducing apparatus such as in FIG. 5 locates the PlayList 1 of the title using the playlist pointer recorded in 'Info.bdav' file and executes system initialization using the system initialization commands contained in PlayList 1 before playing A/V data streams of the title.

Alternatively, the playlist pointer recorded in the 'Info.bdav' file may access a specific playlist file not associated with data streams, for example, a '00000.rpls' file. In this case, the '00000.rpls' file includes a specific playlist, PlayList 0, for accessing PlayList 1 of the title and the specific playlist, PlayList 0, contains system initialization commands.

The reproducing apparatus accesses '00000.rpls' file using the playlist pointer recorded in the 'Info.bdav' file, and then accesses Playlist 1 of the title by consulting PlayList 0 recorded in the '00000.rpls' file. Also, the reproducing apparatus executes system initialization using the system initialization commands contained in the PlayList 0 before playing A/V data streams of the title.

Figure 10:
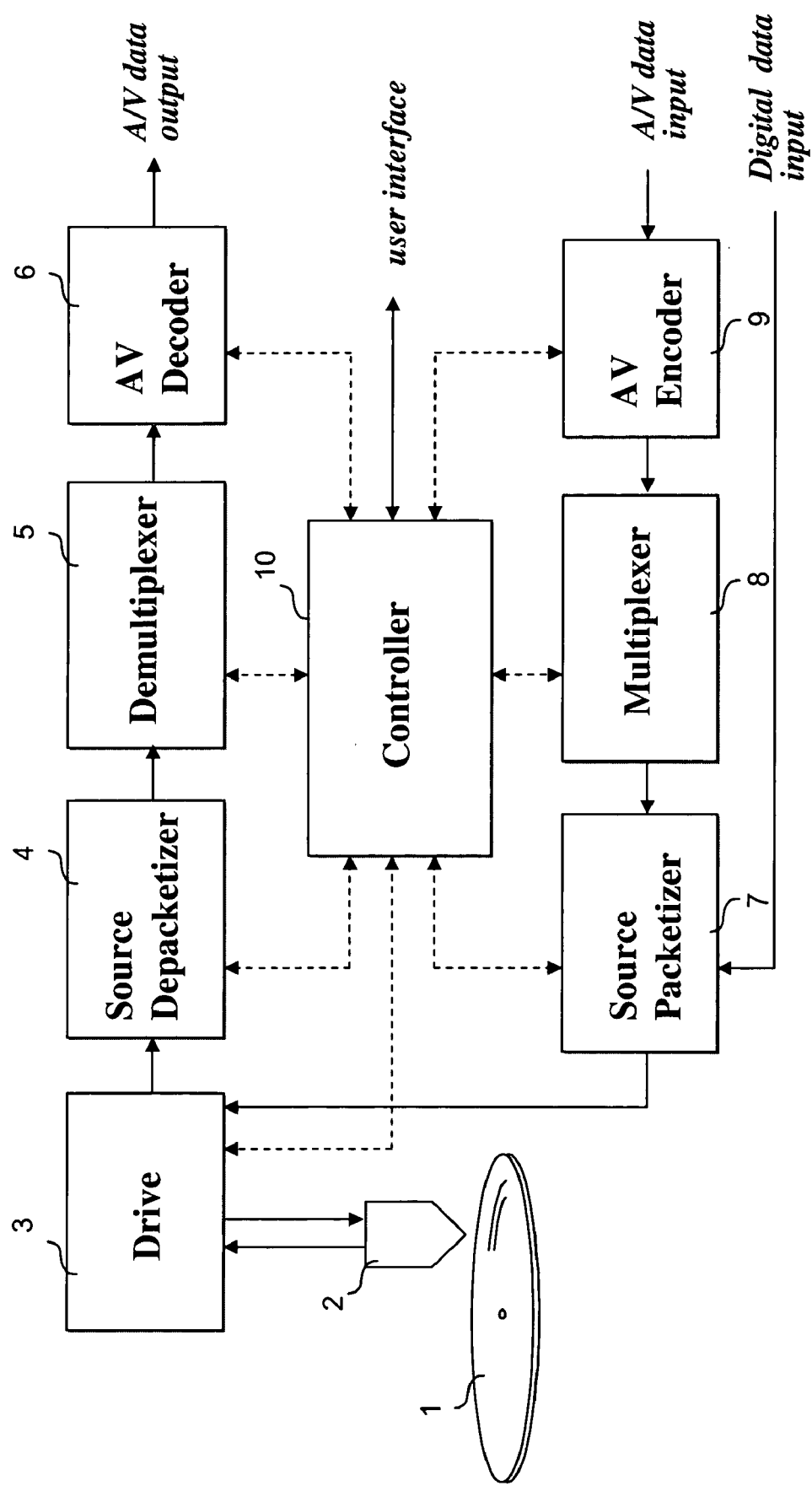
FIG. 10 illustrates an embodiment of a recording and reproducing apparatus according to the present invention.

FIG. 10 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 10, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 2-4 and 6-9 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, when the optical disk is read first playback occurs based on reference to the navigation data such as a segment pointer provided as first reading navigation data.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 10 has been described as a recording and reproducing apparatus, it will be understood that only a recording or only a reproducing apparatus may be provided using those portions of FIG. 10 providing the recording or reproducing function.

The data structure for and method for managing playback control of a high-density recording medium in accordance with embodiments of the present invention allows effective selection and reproduction of component data streams recorded on a high density recording medium such as a BD-ROM.

As apparent from the above description, the present invention provides methods and apparatuses for recording a data structure on a high density recording medium for managing playback control of the recording medium.

The above description further provides methods and apparatus for reproducing data streams recorded on a high density recording medium based on a data structure, also recorded on the high density recording medium, for managing playback control of the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disc storing an executable data structure for managing playback control of a data stream by an optical disc reproducing device, comprising:

an information file including a first playback indicator for managing an automatic playback of the optical disc when the optical disc is inserted into the optical disc reproducing device, the first playback indicator identifying a segment for execution at the automatic playback of the optical disc, the segment being included in a separate file from the information file, the first playback indicator indicating a name of the segment;

the separate file including the segment, the segment including at least one navigation command for launching a playlist file, the playlist file being separate from the separate file;

the playlist file including a playitem representing a playing interval in a clip of a data stream for the automatic playback; and a stream file including the data stream.

2. The optical disc of claim 1, wherein the information file is stored in a main directory, which is a sub-directory of a root directory for the optical disc.

3. The optical disc of claim 1, wherein the segment further includes navigation commands for initializing playback of the data stream and terminating playback of the data stream.

4. The optical disc of claim 1, further comprising:
a clip information file including timing information of the stream file, the clip information file and the stream file being separate files and having one to one correspondence.

5. The optical disc of claim 1, wherein the playitem is a pair of IN and OUT points corresponding to positions on a time axis of the clip of the data stream.

6. A method of recording a data structure for managing playback control of a data stream, comprising:
recording an information file on an optical disc, the information file including a first playback indicator for managing an automatic playback of the optical disc when the optical disc is inserted into an optical disc reproducing device, the first playback indicator identifying a segment for execution at the automatic playback of the optical disc, the segment being included in a separate file from the information file, the first playback indicator indicating a name of the segment;
recording the segment in the separate file on the optical disc, the segment including at least one navigation command for launching a playlist file, the playlist file being separate from the separate file;
recording the playlist file on the optical disc, the playlist file including a playitem representing a playing interval in a clip of a data stream for the automatic playback; and
recording a stream file including the data stream on the optical disc.

7. The method of claim 6, further comprising:
recording navigation commands for initializing playback of the data stream and terminating playback of the data stream in the segment.

8. The method of claim 6, further comprising:
recording a clip information file including timing information of the stream file, the clip information file and the stream file being separate files and having one to one correspondence.

9. The method of claim 6, wherein the playitem is a pair of IN and OUT points corresponding to positions on a time axis of the clip of the data stream.

10. A method of reproducing a data structure for managing playback control of a data stream, comprising:
reproducing an information file from an optical disc, the information file including a first playback indicator for managing an automatic playback of the optical disc when the optical disc is inserted into an optical disc reproducing device, the first playback indicator identifying a segment for execution at the automatic playback of the optical disc, the segment being included in a separate file separate from the information file the first playback indicator indicating a name of the segment;
reproducing the separate file including the segment from the optical disc, the optical disc, the segment including at least one navigation command for launching a playlist file, the playlist file being separate from the separate file;
reproducing the playlist file from the optical disc, the playlist file including a playitem representing a playing interval in a clip of a data stream for the automatic playback; and
reproducing a stream file including the data stream from the optical disc.

11. The method of claim 10, further comprising:
reproducing navigation commands for initializing playback of the data stream and terminating playback of the data stream from the segment.

12. The method of claim 10, further comprising:
reading a clip information file including timing information of the stream file, the clip information file and the stream file being separate files and having one to one correspondence.

13. The method of claim 10, wherein the playitem is a pair of IN and OUT points corresponding to positions on a time axis of the clip of the data stream.

14. An apparatus for recording a data structure for managing playback control of an optical disc, comprising:
a pickup configured to record data on the optical disc; and
a controller operably coupled to the pickup to control the pickup to record an information file on the optical disc, the information file including a first playback indicator for managing an automatic playback of the optical disc when the optical disc is inserted into an optical disc reproducing device, the first playback indicator identifying a segment for execution at the automatic playback of the optical disc, the segment being included in a separate file from the information file, the first playback indicator indicating a name of the segment;
the controller configured to control the pickup to record the separate file including the segment on the optical disc, the segment including at least one navigation command for launching a playlist file, the playlist file being separate from the separate file;
the controller configured to control the pickup to record the playlist file on the optical disc, the playlist file including a playitem representing a playing interval in a clip of a data stream for the automatic playback; and
the controller configured to control the pickup to record a stream file including the data stream on the optical disc.

15. The apparatus of claim 14, wherein the controller is further configured to control the pickup to record navigation commands for initializing playback of the data stream and terminating playback of the data stream in the segment.

16. The apparatus of claim 14, wherein the controller is further configured to control the pickup to record a clip information file including timing information of the stream file, the clip information file and the stream file being separate files and having one to one correspondence.

17. The apparatus of claim 14, wherein the playitem is a pair of IN and OUT points corresponding to positions on a time axis of the clip of the data stream.

18. An apparatus for reproducing a data structure for managing playback control of an optical disc, comprising:
a pickup configured to reproduce data recorded on the optical disc;
a controller operably coupled to the pickup to control the pickup to reproduce an information file from the optical disc, the information file including a first playback indicator for managing an automatic playback of the optical disc when the optical disc is inserted into an optical disc reproducing device, the first playback indicator identifying a segment for execution at the automatic playback of the optical disc, the segment being included in a separate file from the information file the first playback indicator indicating a name of the segment;
the controller configured to control the pickup to reproduce the separate file including the segment from the optical disc, the segment including at least one navigation command for launching a playlist file;

the controller configured to control the pickup to reproduce the playlist file from the optical disc, the playlist file including a playitem representing a playing interval in a clip of a data stream for the automatic playback; and the controller configured to control the pickup to reproduce a stream file including the data stream from the optical disc.

19. The apparatus of claim 18, wherein the controller is further configured to control the pickup to reproduce navigation commands for initializing playback of the data stream and terminating play back of the data stream from the segment.

20. The apparatus of claim 18, further comprising:

a source depacketizer configured to depacketize source packets into transport packets;

a de-multiplexer, operably coupled to the source depacketizer, configured to demultiplex the transport packets into at least one elementary stream; and a decoder, operably coupled to the de-multiplexer, configured to decode the elementary stream to an original data stream to be displayed on a display.

21. The apparatus of claim 20, wherein the source depacketizer, the de-multiplexer, the decoder, and the controller are part of a video disk play system.

22. The apparatus of claim 18, wherein the controller is further configured to control the pickup to read a clip information file including timing information of the stream file, the clip information file and the stream file being separate files and having one to one correspondence.

23. The apparatus of claim 18, wherein the playitem is a pair of IN and OUT points corresponding to positions on a time axis of the clip of the data stream.

* * * * *

UNITED STATES PATENT AND TRADEMARK OFFICE
CERTIFICATE OF CORRECTION

| | | |
|---|---|---|
| PATENT NO. | : 7,809,775 B2 | |
| APPLICATION NO. | : 10/777637 | |
| DATED | : October 5, 2010 | |
| INVENTOR(S) | : Kang Soo Seo et al. | |

It is certified that error appears in the above-identified patent and that said Letters Patent is hereby corrected as shown below:

In claim 10 at column 9, line 56, "information file the first playback" should be changed to --information file, the first playback--

In claim 18 at column 10, line 62, "information file the first playback" should be changed to --information file, the first playback--

Signed and Sealed this
Twenty-second Day of March, 2011

David J. Kappos
*Director of the United States Patent and Trademark Office*